2,753,140

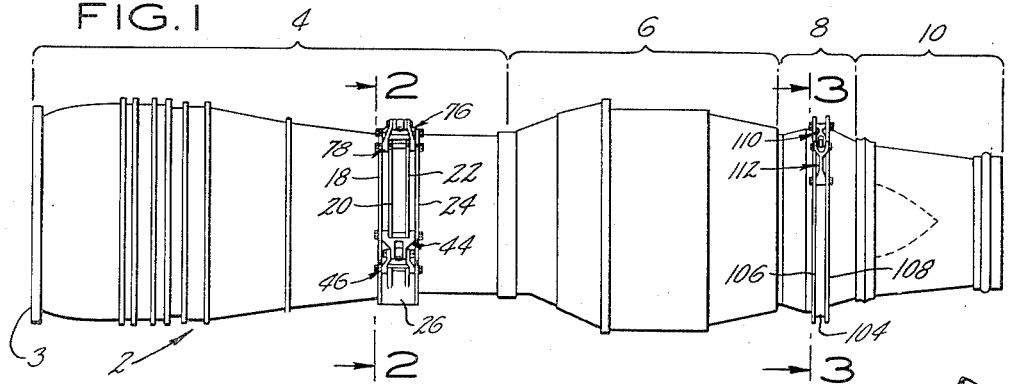
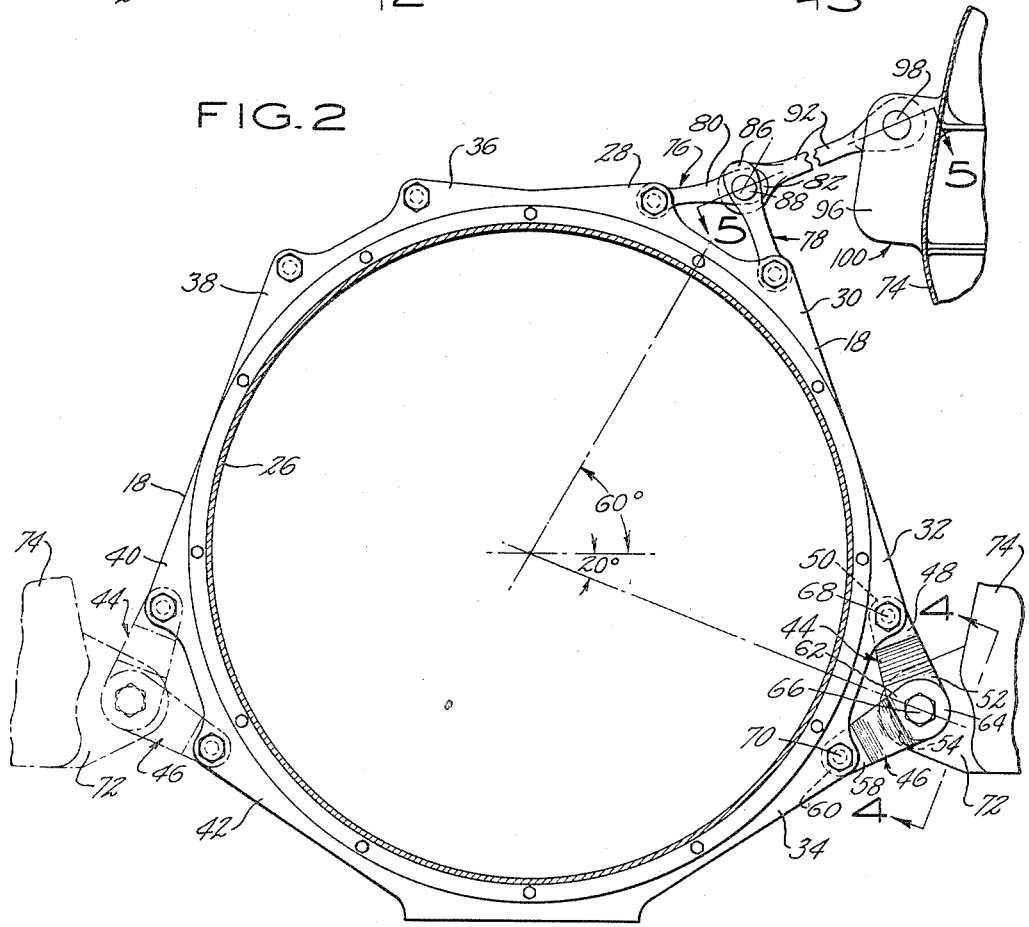

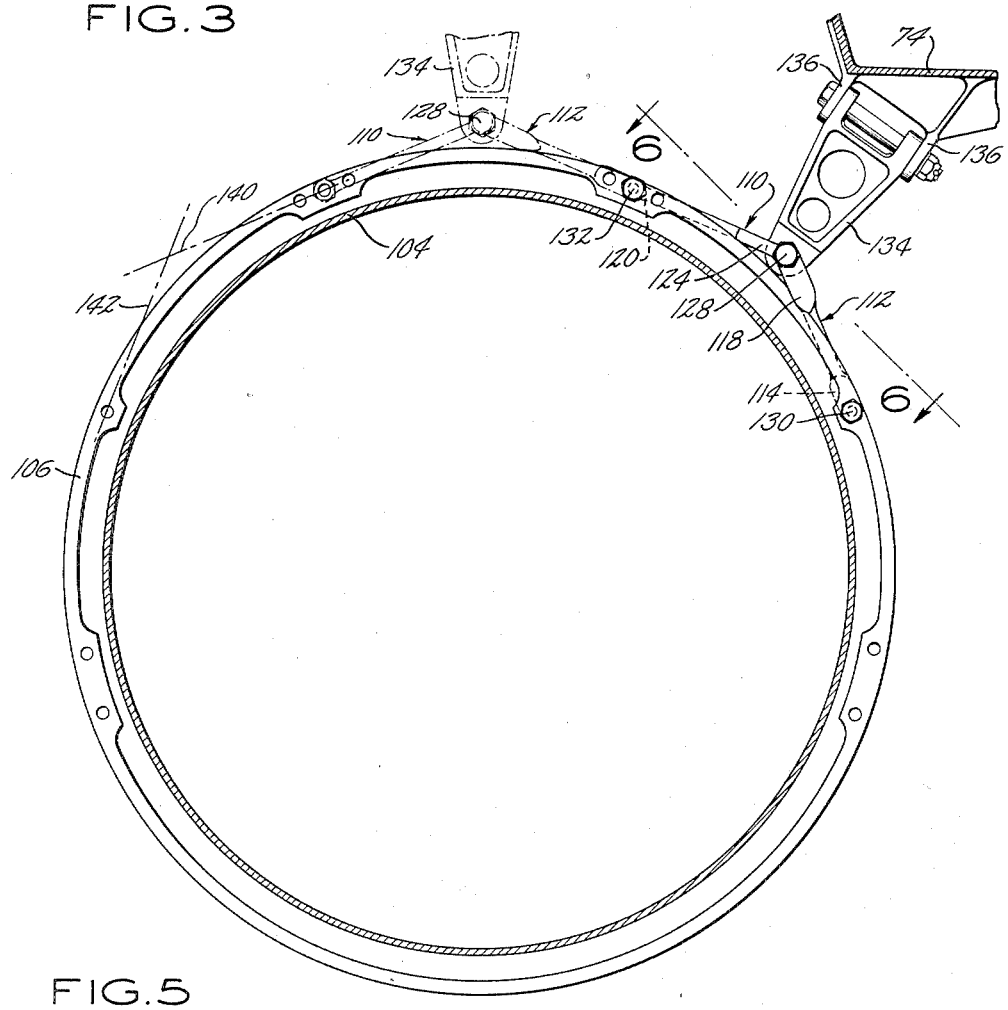
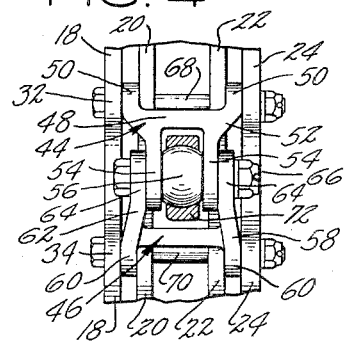
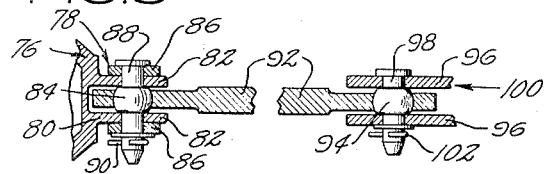
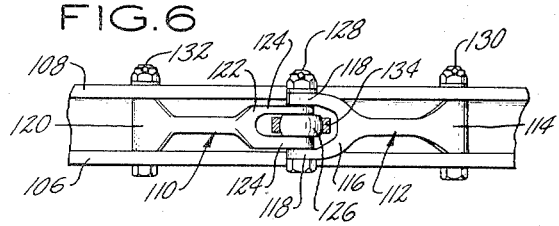
INVENTORS
AUGUSTUS HASBROUCK
AUBREY B. MILLER
BY Jack N. McCarthy
AGENT

United States Patent Office 2,753,140
Patented July 3, 1956

ENGINE MOUNT

Augustus Hasbrouck, Middletown, and Aubrey B. Miller, Hartford, Conn., assignors to United Aircraft Corporation, East Hartford, Conn., a corporation of Delaware Application July 28, 1951, Serial No. 239,094

10 Claims. (Cl. 248—5)

This invention relates to improvements in engine suspension means and has particular reference to an improved mount which, while not limited thereto, is particularly adapted to the mounting of a jet engine used in aircraft.

An object of this invention is to provide an improved engine suspension means for connecting an engine to its support which will minimize deformation of the outer casing of the engine.

Another object of the invention is to provide a mounting system in which the engine can be mounted symmetrically, or asymmetrically from one side of the engine or the other.

A further object is to provide a two-plane link-type mounting system for a thin walled cylinder having a large diameter, which will prevent the cylinder from becoming out of round in any plane perpendicular to the axis of the cylinder.

Other objects and advantages will become apparent from the following description.

In the accompanying drawings there is illustrated a suitable mechanical embodiment for the purpose of disclosing the invention. The drawings, however, are for the purpose of illustration only and are not to be taken as limiting or restricting the invention. It will be apparent to those skilled in the art that various changes in the illustrated construction may be made without exceeding the scope of the invention.

Fig. 1 is a view in elevation of a jet engine showing the mounting system positioned asymmetrically on one side.

Fig. 2 is a cross-sectional view taken along the line 2—2 of Fig. 1 with one mount link in phantom in one position to show the alternative symmetrical mounting in the front plane.

Fig. 3 is a cross-sectional view taken along the line 3—3 of Fig. 1 with the rear mount link in phantom in one position to show the symmetrical mounting in the rear plane.

Fig. 4 is a view taken along line 4—4 of Fig. 2.

Fig. 5 is a cross-sectional view taken along line 5—5 of Fig. 2.

Fig. 6 is a view taken along line 6—6 of Fig. 3.

In Fig. 1 a jet engine 2 has an inlet 3, a compressor section 4, burner section 6, turbine section 8 and tail pipe 10. According to this invention the engine is supported in two axially spaced transverse planes, one through the compressor section 4 and the other through the turbine section 8.

The front support includes a number of annular flanges 18, 20, 22, and 24 on a portion 26 of the compressor casing, these flanges being arranged in pairs as shown in Figs. 1 and 4. Each flange has sets of four lugs 28, 30, 32 and 34 arranged in circumferentially spaced pairs, Fig. 2, on one side of the vertical axis of the engine and similar lugs 36, 38, 40 and 42 on the other side. The lugs in the several flanges are aligned as shown.

In the front lower mount, shown in solid lines, two links 44 and 46 are incorporated (see Fig. 2). Link 44 has a bifurcated portion 48, Fig. 4, on one end with tines 50 and a bifurcated portion 52 on the other end with tines 54. The tines 54 are spaced apart so that a ball 56 can be placed therebetween. The other link 46 has a bifurcated portion 58 on one end with tines 60 and a bifurcated portion 62 on the other end with tines 64. The tines 64 are spaced apart so as to extend around tines 54 of link 44. A bolt 66 extends through aligned holes in the tines 64 and 54 and through the ball 56. Tines 50 of links 44, respectively, are spaced apart so that they project between the lugs 32 on the pairs of flanges 18 and 20, for one tine and flanges 22 and 24 for the other tine. Similarly the tines 60 of link 46 project between the lugs 34 of the spaced pairs of flanges. Bolt 68 extends through aligned holes in tines 50 and lugs 32 and bolt 70 extends through aligned holes in tines 60 and lugs 34 to fix links 44 and 46 to the engine casing. With this arrangement this mount functions to prevent axial movement of the engine with respect to the supporting structure.

The ball 56 is universally held by fixed arm 72 which extends from the frame 74 of the aircraft. The lugs 32 and 34 are placed, and the links 44 and 46 are constructed, so that the center of the ball 56 is located at an angle of 20° below a horizontal line passing through the axis of the engine as installed as measured from said axis. These links are also positioned so that they extend substantially tangentially to the casing.

The other front lower mount, which is shown in dot-and-dash lines, is constructed in the same manner as the other lower mount and is used in a manner to be hereinafter described.

In the front upper mount a link arrangement is incorporated much in the same manner as in the front lower mount, described above, having two bifurcated links 76 and 78 similar to links 44 and 46. These links 76 and 78 are connected to the lugs 28 and 30, respectively, of the spaced pairs of flanges 18, 20 and 22, 24 in a manner identical with that described in the attachment of links 44 and 46. The other end of link 76, Fig. 5, has a bifurcated portion 80 with tines 82. The tines 82 are spaced apart so that a ball 84 can be placed therebetween. The other end of link 78 has a bifurcated portion with tines 86 straddling tines 82. A pin 88 extends through aligned holes in tines 82 and a hole in 86 and ball 84. A locking pin 90 holds the pin 88 in place. This mount prevents transverse motion of the engine relative to the supporting structure.

The ball 84 is universally held by arm 92 which is universally attached at its other end to a ball 94 which is held between flanges 96 on a member 100 by a pin 98. Member 100 is fixed to the frame 74 of the aircraft. A locking pin 102 holds the pin 98 in place. The lugs 28 and 30 for this mount are so placed, and the links 76 and 78 are so constructed that the center of the ball 84 is located at an angle of 60° above a horizontal line as measured from the center of the casing. These links are also positioned so that they extend substantially tangentially to the casing.

The rear support, Fig. 3, is located at a substantially circular section 104 of the engine casing on which are mounted two circlar flanges 106 and 108. In the rear mount two links 110 and 112 are incorporated (see Fig. 3). Link 112 has a lug 114 on one end and a bifurcated portion 116 on the other end with tines 118. The other link 110 has a lug 120 on one end and a bifurcated portion 122 on the other end with tines 124. The tines 124 are spaced apart so that a ball 126 can be placed therebetween. The tines 118 are spaced apart so as to extend around tines 124 of link 110. A bolt 128 extends through aligned holes in tines 118 and 124 and through ball 126. Lugs 114 and 120 of links 112 and 110, respectively, project between the flanges 106 and 108. A bolt 130 extends through aligned holes in flanges 106 and 108 and lug 114. Bolt 132 extends through aligned holes in flanges 106 and 108 and lug 120.

The ball 126 is universally held by arm 134 which is pivoted at its other end on a bolt 135 extending between lugs 136 which are fixed to the frame 74 of the aircraft. The holes in the flanges 106 and 108 which receive the bolts 130 and 132 are so placed, and the links 110 and 112 are so constructed that the links extend substantially tangentially to the casing. The bolt 135 is located in a plane at right angles to the engine axis and the pivotal movement of arm 34 permits axial movement of the ball 128 and therefore axial movement of this portion of the engine relative to the supporting structure.

The other rear mount, shown in dot-and-dash lines on the vertical axis is used in a manner to be hereinafter described.

This mounting system has been constructed so that an engine can be mounted symmetrically in an aircraft or asymmetrically. When it is to be mounted asymmetrically on the right side of a frame member such as the member 74 the mounting positions are used as shown in full lines in Fig. 2 and Fig. 3, Fig 2 representing the front plane and Fig. 3 representing the rear plane. When the engine is to be mounted asymmetrically on the left side of a frame member, the mount linkages as shown in full lines in Fig. 2 are connected to lugs 36, 38, 40 and 42 in the front plane and the mount links 110 and 112 of the rear plane are in the position as shown by center lines 140 and 142.

When the engine is to be mounted symmetrically the front lower mount shown in full and the front lower mount shown by dot-and-dash lines are connected in the front plane and the mount links shown in dot-and-dash lines on the vertical axis in Fig. 3 are used in the rear plane.

While a suitable mechanical embodiment has been hereinabove described and illustrated in the accompanying drawings for the purpose of disclosing the invention, it is to be understood that the invention is not limited to the particular embodiment so illustrated and described, but that such changes in the size, shape and arrangement of the various parts may be resorted to as coming within the scope of the adjoining claims.

We claim:

1. An engine mount for connecting an engine having a case substantially circular in two axially spaced planes to a supporting frame including axially spaced mounting structures, one of which, at one of said planes, includes interconnected means including links adapted to extend substantially tangentially to the engine to be mounted on the engine and the frame, said links being pivoted to the engine solely for movement on axes parallel to the engine axis, the other ends of the links being mounted on a parallel axis, both ends of each link being supported against axial movement thereby to prevent relative movement of the engine axially with respect to the frame, the other mount, at the other of said planes, having a linkage arrangement including other links adapted to be connected to the engine and frame, said last links at one end being axially movable to provide for axial movement between the engine and frame at this point, said last links being otherwise attached so as to limit transverse movement between engine and frame, and an additional connection adjacent to one of said mounts limiting transverse movement of the engine at this point.

2. An engine mount for connecting an engine having a case substantially circular in two axially spaced planes to a supporting frame including axially spaced mounting structures, one of which, at one of said planes, includes interconnected means including links adapted to extend substantially tangentially to the engine to be mounted on the engine and the frame, said links being pivoted to the engine solely for movement on axes parallel to the engine axis, the other ends of the links being mounted on a parallel axis, both ends of each link being supported against axial movement thereby to prevent relative movement of the engine axially with respect to the frame, the other mount, at the other of said planes, having a linkage arrangement including other links adapted to extend substantially tangentially to the engine to be connected to the engine and frame, said other links at one end being axially movable to provide for axial movement between the engine and frame at this point, and other links being otherwise attached so as to limit transverse movement between engine and frame, and an additional connection adjacent to one of said mounts limiting transverse movement of the engine at this point.

3. An engine mount for connecting an engine having a case substantially circular in two axially spaced planes to a supporting frame including axially spaced mounting structures, one of which, at one of said planes, includes interconnected means including links adapted to extend substantially tangentially to the engine to be mounted on the engine and the frame, said links being pivoted to the engine solely for movement on axes parallel to the engine axis, the other ends of the links being mounted on a parallel axis, both ends of each link being supported against axial movement thereby to prevent relative movement of the engine axially with respect to the frame, the other mount, at the other of said planes, having a linkage arrangement including other links adapted to extend substantially tangentially to the engine to be connected to the engine and frame, said other links at one end being axially movable to provide for axial movement between the engine and frame at this point, said other links being otherwise attached so as to limit transverse movement between engine and frame, and an additional connection adjacent to one of said mounts, said additional connection including interconnected rods extending tangentially to the engine and connected thereto, and a support on said frame connected to the rods limiting transverse movement of the engine at this point.

4. An engine mount for connecting an engine having a case substantially circular in two axially spaced planes to a supporting frame including axially spaced mounting structures, one of which, at one of said planes, includes interconnected means including links adapted to extend substantially tangentially to the engine to be mounted on the engine and the frame, said links being pivoted to the engine solely for movement on axes parallel to the engine axis, the other ends of the links being mounted on a parallel axis, both ends of each link being supported against axial movement thereby to prevent relative movement of the engine axially with respect to the frame, the other mount, at the other of said planes, having a linkage arrangement including other links adapted to be connected to the engine and frame, said last links at one end being axially movable to provide for axial movement between the engine and frame at this point, said last links being otherwise attached so as to limit transverse movement between engine and frame, and an additional connection adjacent to said first mount, said additional connection including interconnected rods extending substantially tangentially to the engine and connected thereto, and a support on said frame connected to the rods limiting transverse movement of the engine at this point, said engine having at least one radially projecting flange extending around the engine to which the first mount and the additional connection are attached.

5. An engine mount for connecting an engine having a case substantially circular in two axially spaced planes to a supporting frame including axially spaced mounting structures, one of which, at one of said planes, includes interconnected means adapted to be mounted on the engine and the frame, said means including links pivoted to the engine solely for movement on axes parallel to the engine axis, the other ends of the links being mounted on a parallel axis, both ends of each link being supported against axial movement thereby to prevent relative movement of the engine axially with respect to the frame, the other mount, at the other of said planes, having a linkage arrangement including other links adapted to extend substantially tangentially to the engine to be connected to the engine and frame, said last links at one end being axially movable to provide for axial movement between the engine and frame at this point, said last links being otherwise attached so as to limit transverse movement between engine and frame, and an additional connection adjacent to said first mount, said additional connection including interconnected rods extending substantially tangentially to the outer diameter of the engine and connected thereto, and a support on said frame connected to the rods limiting transverse movement of the engine at this point, said engine having at least one radially projecting flange extending around the engine to which the first mount and the additional connection are attached.

6. An engine mount for connecting an engine having a case substantially circular two axially spaced planes to a supporting frame including axially spaced mounting structures, one of which, at one of said planes, includes interconnected means including links adapted to extend substantially tangentially to the engine to be mounted on the engine and the frame, said links being pivoted to the engine solely for movement on axes parallel to the engine axis, the other ends of the links being mounted on a parallel axis, both ends of each link being supported against axial movement thereby to prevent relative movement of the engine axially with respect to the frame, the other mount, at the other of said planes, having a linkage arrangement including other links adapted to extend substantially tangentially to the engine to be connected to the engine and frame, said last links at one end being axially movable to provide for axial movement between the engine and frame at this point, said last links being otherwise attached so as to limit transverse movement between engine and frame, and an additional connection adjacent to said first mount, said additional connection including interconnected rods extending substantially tangentially to the outer diameter of the engine and connected thereto, and a support on said frame connected to the rods limiting transverse movement of the engine at this point, said engine having at least one radially projecting flange extending around the engine to which the first mount and the additional connection are attached.

7. In combination, an engine having a casing circular in two planes, a frame, means for mounting said engine on said frame including mounts located in said two planes, said means including a first mount unit in one plane consisting of two links connected to said engine and extending substantially tangentially to the casing in said plane, an arm fixed to said frame, the free ends of the links of said first mount unit being universally connected to said arm, a second mount unit in the same plane consisting of two links connected to said engine and extending substantially tangentially to the casing in said plane, a frame link having one end universally connected to said frame, the free ends of the links of said second mount unit being universally connected to the other end of said frame link, a third mount unit in a second plane consisting of two links connected to said engine and extending substantially tangentially to the casing in said plane, an arm pivotally mounted to said frame, the free ends of the links of said third mount unit being universally connected to the free end of said pivoted arm.

8. A mounting system for mounting an engine onto a frame having its mounting units in two planes, the front plane having two mounting units, a lower mounting unit being located below a horizontal line passing through the center of said engine and an upper mounting unit being located above a horizontal line passing through the center of said engine, the upper and lower mounting units each consisting of two links extending substantially tangentially to the engine, one end of each link being connected to the engine, the free ends of each link being bifurcated and having a hole therethrough, one link of each mounting unit having its bifurcated portion larger than the bifurcated portion of the other link so that one fits over the other, a ball for each mounting unit having a hole therethrough and fitting in the smaller bifurcated portion, a bolt for each mounting unit passing through the holes in the bifurcated portions of its links and through its ball to connect said links and mount said ball, an arm holding the ball of the lower mounting unit and being rigidly fixed at its other end to said frame, a link holding the ball of the upper mounting unit at one end and being universally attached to the frame at its other end, the rear plane having one mounting unit, said mounting unit being located above a horizontal line passing through the center of said engine, said mounting unit consisting of two links, one end of each link being connected to the engine, the free ends of each link being bifurcated and having a hole therethrough, the bifurcated portion of one link being larger than the bifurcated portion of the other link so that one fits over the other, a ball having a hole therethrough fitting in the smaller bifurcated portion, a bolt passing through the holes in the bifurcated portions of said links and through its ball to connect said links and mount said ball, an arm holding said ball at one end and being pivotally connected at its other end to said frame member.

9. In combination, an engine having a case circular in two planes, a frame, means for mounting said engine from one side on said frame including mounts located in said two planes, said means including a first mount unit on one side of said engine in one plane consisting of two links connected at one end to said engine and extending substantially tangentially to the casing in said plane, an arm fixed to said frame, the other ends of the links of said first mount unit being connected to said arm, a second mount unit on the same one side of said engine and in the same plane consisting of two links connected to said engine and extending substantially tangentially to the casing in said plane, a frame link having one end connected to said frame, the free ends of the links of said second mount unit being connected to the other end of said frame link, a third mount unit on said one side of said engine in a second plane consisting of two links connected to said engine and extending substantially tangentially to the casing in said plane, an arm pivotally mounted to said frame, the free ends of the links of said third mount unit being connected to the free end of said pivoted arm.

10. An engine mount for connecting an engine to a frame including axially spaced mounting structures on one side of an engine, one structure on the one side of the engine includes interconnected means having links adapted to extend substantially tangentially to the engine to be mounted on the engine and the frame, said links being pivoted to the engine solely for movement on axes parallel to the engine axis, the other ends of the links being mounted on a parallel axis, both ends of each link being supported against axial movement thereby to prevent relative movement of the engine axially with respect to the frame, the other mount structure on the one side of said engine having a linkage arrangement including other links adapted to extend substantially tangentially to the engine to be connected to the engine and the frame, said other links at one end being axially movable to provide for axial movement between the engine and frame at this point, said links being otherwise connected so as to limit transverse movement between engine and frame, and an additional connection on said one side of said engine adjacent to one of said mounts limiting transverse movement of the engine at this point.

(References on following page)

References Cited in the file of this patent

UNITED STATES PATENTS

| | | |
|---|---|---|
| 2,481,547 | Walker et al. | Sept. 13, 1949 |
| 2,529,955 | Morley | Nov. 14, 1950 |
| 2,587,345 | Lombard | Feb. 26, 1952 |
| 2,591,399 | Buckland et al. | Apr. 1, 1952 |

FOREIGN PATENTS

| | | |
|---|---|---|
| 482,135 | Great Britain | Mar. 24, 1938 |
| 506,645 | Great Britain | May 30, 1939 |